United States Patent [19]

Grabill

[11] Patent Number: 5,051,051
[45] Date of Patent: Sep. 24, 1991

[54] RACK AND DIE MOVER

[75] Inventor: Dale L. Grabill, Sioux Rapids, Iowa

[73] Assignee: Simonsen Iron Works, Inc., Sioux Rapids, Iowa

[21] Appl. No.: 524,001

[22] Filed: May 16, 1990

[51] Int. Cl.$^5$ .............................................. B65G 1/04
[52] U.S. Cl. .................................... 414/282; 414/277; 414/279; 414/667; 280/43.23
[58] Field of Search ............... 414/266, 267, 282, 273, 414/277, 279, 281, 667, 222, 745.7, 745.1; 280/43.23; 100/152

[56] References Cited

U.S. PATENT DOCUMENTS

| | | |
|---|---|---|
| 2,553,378 | 5/1951 | Miller . |
| 2,765,928 | 10/1956 | Riemenschneider . |
| 3,183,828 | 5/1965 | Clements ...................... 280/43.23 X |
| 3,368,479 | 2/1968 | Gregorovich ............... 280/43.23 X |
| 3,389,652 | 6/1968 | Bruder et al. ................... 414/277 X |
| 4,076,132 | 2/1978 | Thompson et al. . |
| 4,113,119 | 9/1978 | Brown . |
| 4,372,724 | 2/1983 | Stolzer ........................... 414/279 X |
| 4,541,766 | 9/1985 | Dahl . |
| 4,726,725 | 2/1988 | Baker et al. . |
| 4,776,741 | 10/1988 | Elhaus . |
| 4,838,749 | 6/1989 | Potocjnak . |

FOREIGN PATENT DOCUMENTS 765133 9/1980 U.S.S.R. ............................. 414/279

Primary Examiner—Frank E. Werner
Attorney, Agent, or Firm—Henderson & Sturm

[57] ABSTRACT

A rack and die mover including a die rack frame having a storage structure attached thereto for holding a plurality of elongated dies in a substantially horizontal orientation. A lateral translating mechanism is attached to the frame so that when dies are placed thereon they can be moved to one side of the frame over toward the pressbrake machine where they can be slid onto or off from the pressbrake machine. A mechanism is also provided for selectively adjusting the vertical position of the lateral translating mechanism with respect to the frame whereby it can be used to transfer a die to or from a machine at more than one vertical level. A lift frame is provided which has arms thereon for extending under the elongated dies for lifting them up off of either the storage rack or up off of the lateral translating mechanism. The frame is movable toward the die rack and away from the die rack frame so that the raising or lowering function can occur without interference with the other dies on the die rack frame or with the lateral translating mechanism.

5 Claims, 4 Drawing Sheets

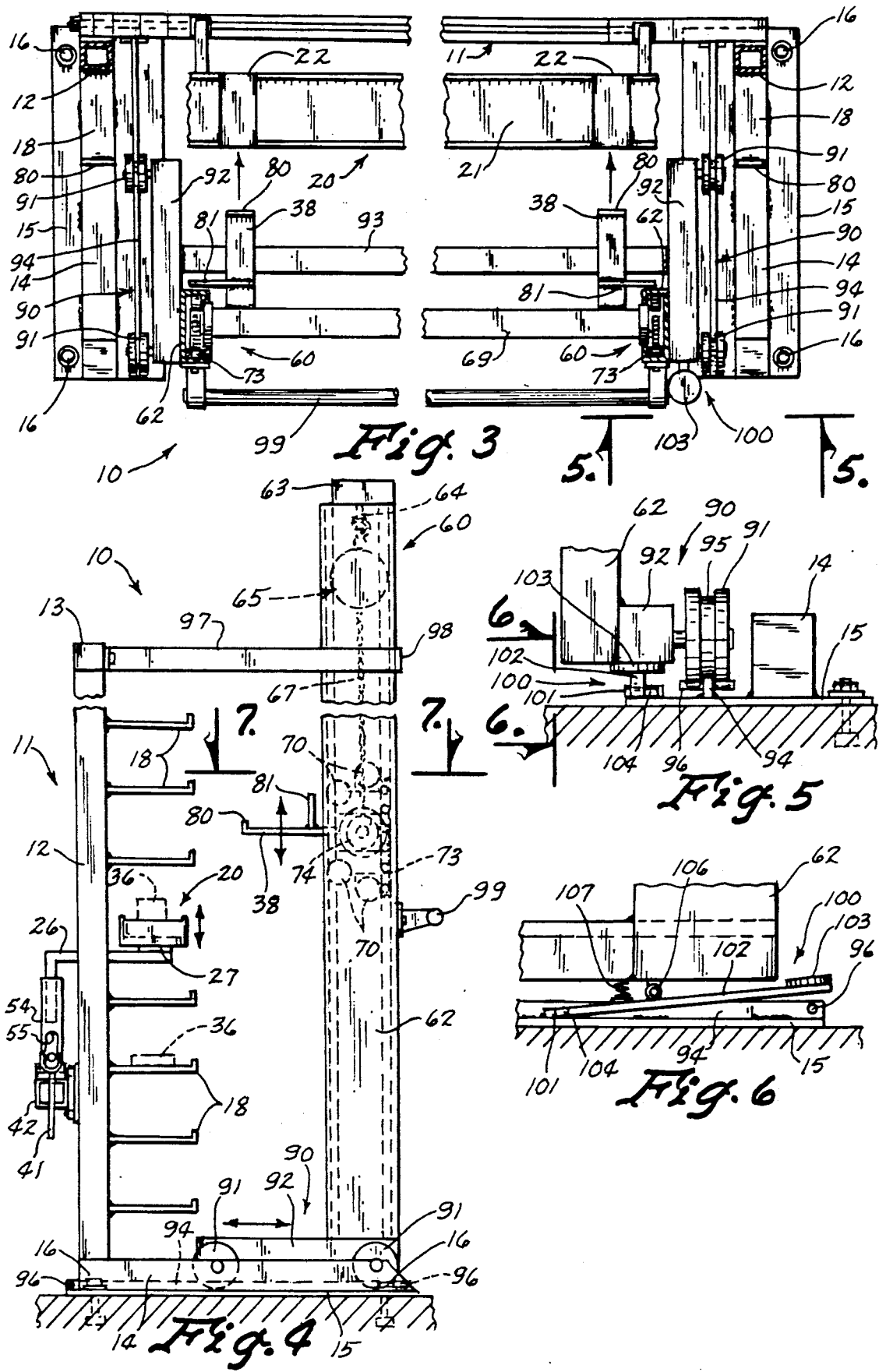

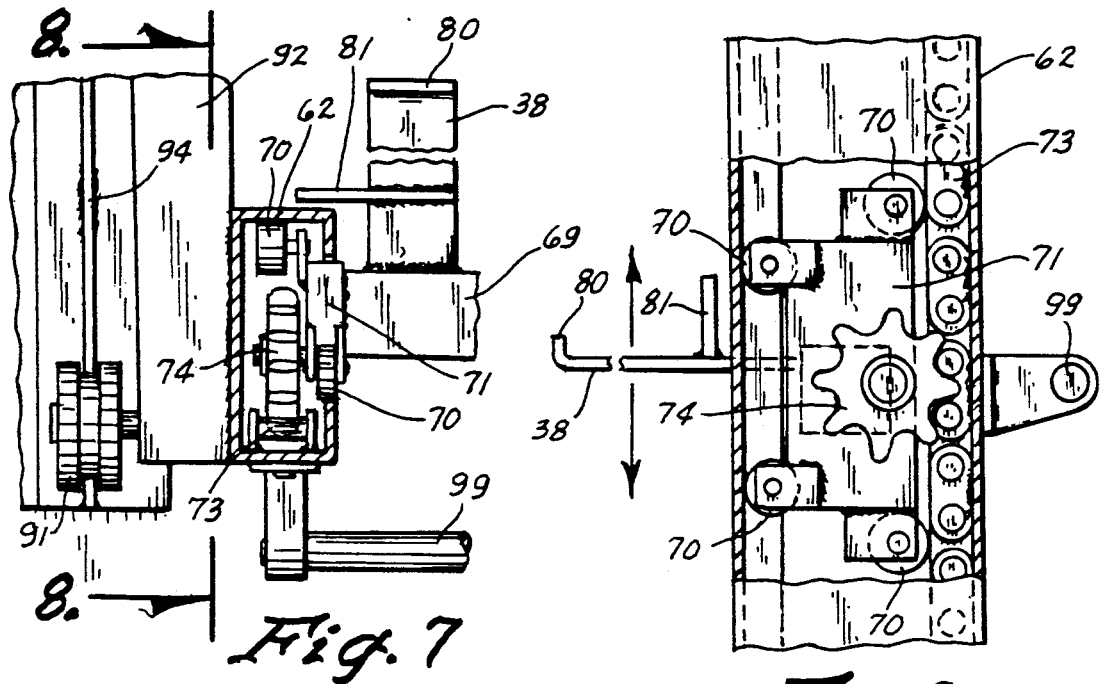
Fig. 7
Fig. 8
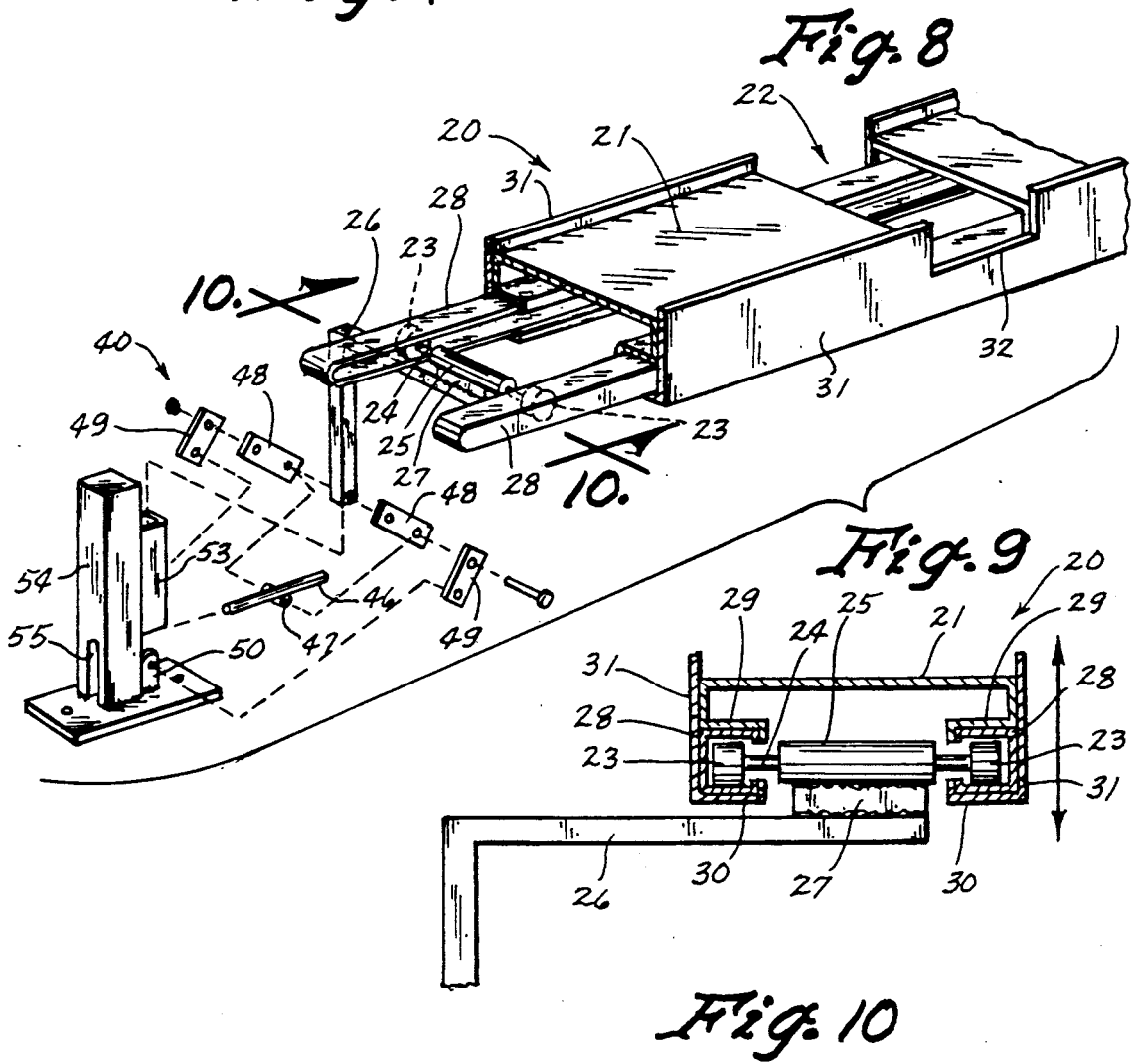
Fig. 9
Fig. 10

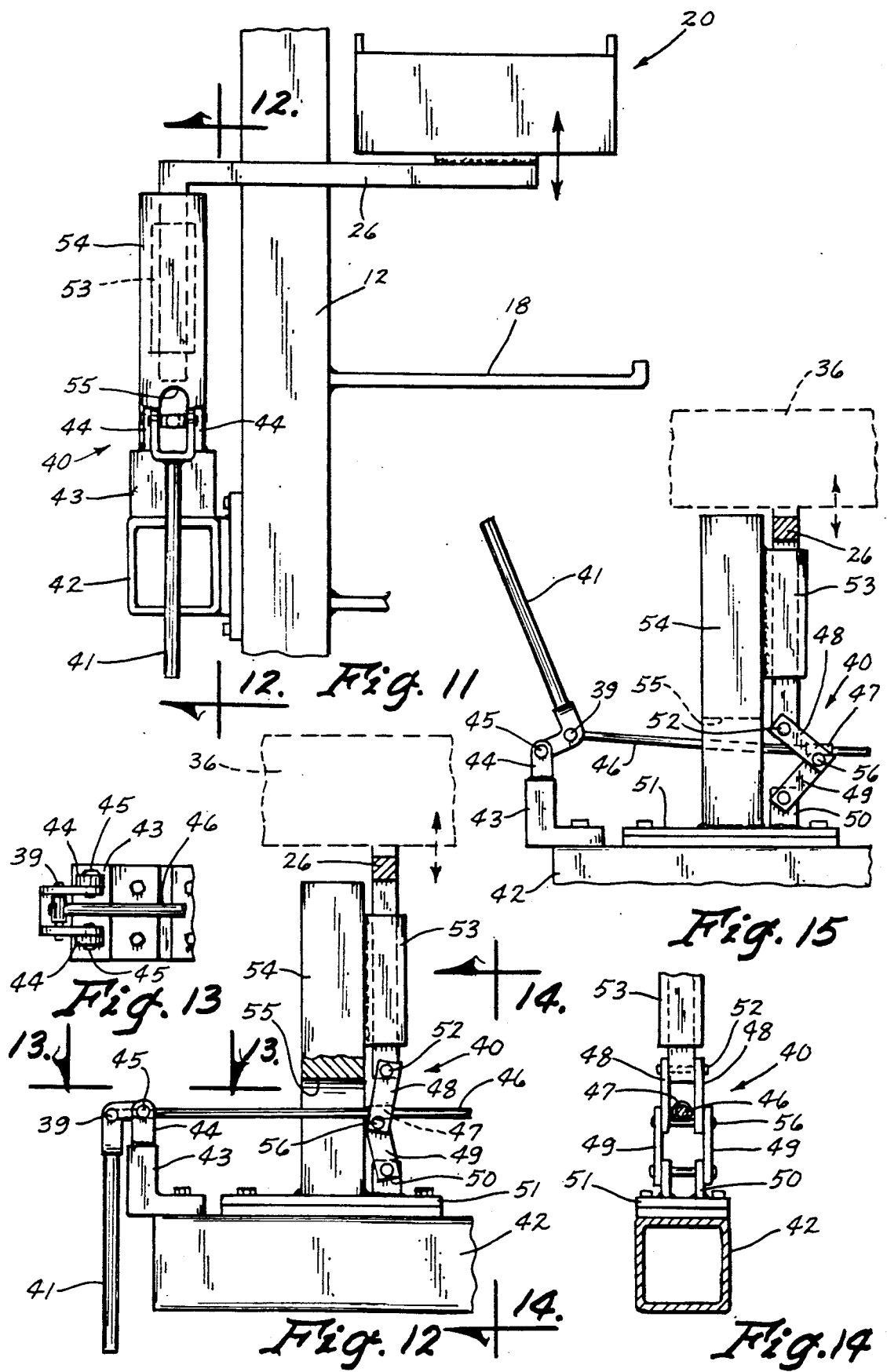

RACK AND DIE MOVER

TECHNICAL FIELD

The present invention relates generally to a rack and die mover and more particularly to such a device which obviates the need for most of the manual labor normally associated with moving large and heavy dies onto and off from a pressbrake machine on which they are used and for storage of these dies when they are not being used.

BACKGROUND ART

Pressbrake machines use long heavy dies which often weight several hundred pounds. Because of the size and weight of these dies and the fact that they must often be changed from one job to the next, the storage and movement of these dies becomes a problem. To carry these dies from a storage rack to the pressbrake machine and from the pressbrake machine to the storage rack would normally require two or three people and there is a great potential for back injuries, pinched fingers and damage to the dies if they are dropped or improperly handled.

Quite often, this movement of the dies between the pressbrake machine and the storage rack is assisted by the use of a forklift but this requires that an open space be left in front of the pressbrake and in front of the die storage area. It is of course elementary that the more area required means that the overhead costs are increased.

Disclosure of the Invention

The present invention relates to a rack and die mover including a die rack frame having a storage structure attached thereto for holding a plurality of elongated dies in a substantially horizontal orientation. A lateral translating mechanism is attached to the frame so that when dies are placed thereon, they can be moved to one side of the frame over toward the pressbrake machine where they can be slid onto or off from the pressbrake machine.

A mechanism is also provided for selectively adjusting the vertical position of the lateral translating means with respect to the frame whereby it can be used to transfer a die to or from a machine at more than one vertical level. A lift frame is provided which has arms thereon for extending under the elongated dies for lifting them up off of either the storage rack or up off of the lateral translating mechanism. The frame is movable toward the die rack and away from the die rack frame so that the raising or lowering function can occur without interference with the other dies on the die rack frame or with the lateral translating mechanism.

An object of the present invention is to provide a rack and die mover.

Another object of the present invention is to eliminate the need to manually move dies between a pressbrake machine and a storage area.

A further object of the present invention is to provide convenient storage for dies to facilitate quick and easy transfer between the rack storage area and a pressbrake machine on which the dies are used.

A further object of the present invention is to provide a rack and die mover which will save space in a factory or the like.

A still further object of the present invention is to provide a rack and die mover which will promote the safety of those operating pressbrake machines.

Other objects, advantages, and novel features of the present invention will become apparent from the following detailed description of the invention when considered in conjunction with the accompanying drawings.

Brief Description of the Drawings

FIG. 3 is a top plan view of the rack and die mover of FIG. 1;

FIG. 4 is a side elevational view taken along line 4—4 of FIG. 2;

FIG. 5 is an enlarged partial cross sectional view taken along line 5—5 of FIG. 3 and showing the locking mechanism of the lift frame;

FIG. 6 is an enlarged partial cross sectional view taken along line 6—6 of FIG. 5 and also showing the locking and unlocking mechanism of the lift frame;

FIG. 7 is an enlarged partial cross sectional view taken along line 7—7 of FIG. 5;

FIG. 8 is a cross sectional view taken along line 8—8 of FIG. 7;

FIG. 9 is an enlarged, partial, perspective, exploded view of the lateral translating mechanism with the vertical lift structure associated therewith;

FIG. 10 is an enlarged partial cross sectional view taken along line 10—10 of FIG. 9;

FIG. 11 is an enlarged partial view taken along line 11—11 of FIG. 1 and showing a portion of the vertical adjustment mechanism for the lateral translating mechanism attached to the rack frame;

FIG. 12 is a cross sectional view taken along line 12—12 of FIG. 11;

FIG. 13 is a partial view taken along line 13—13 of FIG. 12;

FIG. 14 is a view taken along line 14—14 of FIG. 12; and

FIG. 15 is a view like FIG. 12 but showing the lateral translating mechanism in a lowered position by the vertical lift mechanism instead of in a raised position as is shown in FIG. 12.

BEST MODE FOR CARRYING OUT THE INVENTION

Figure 1:
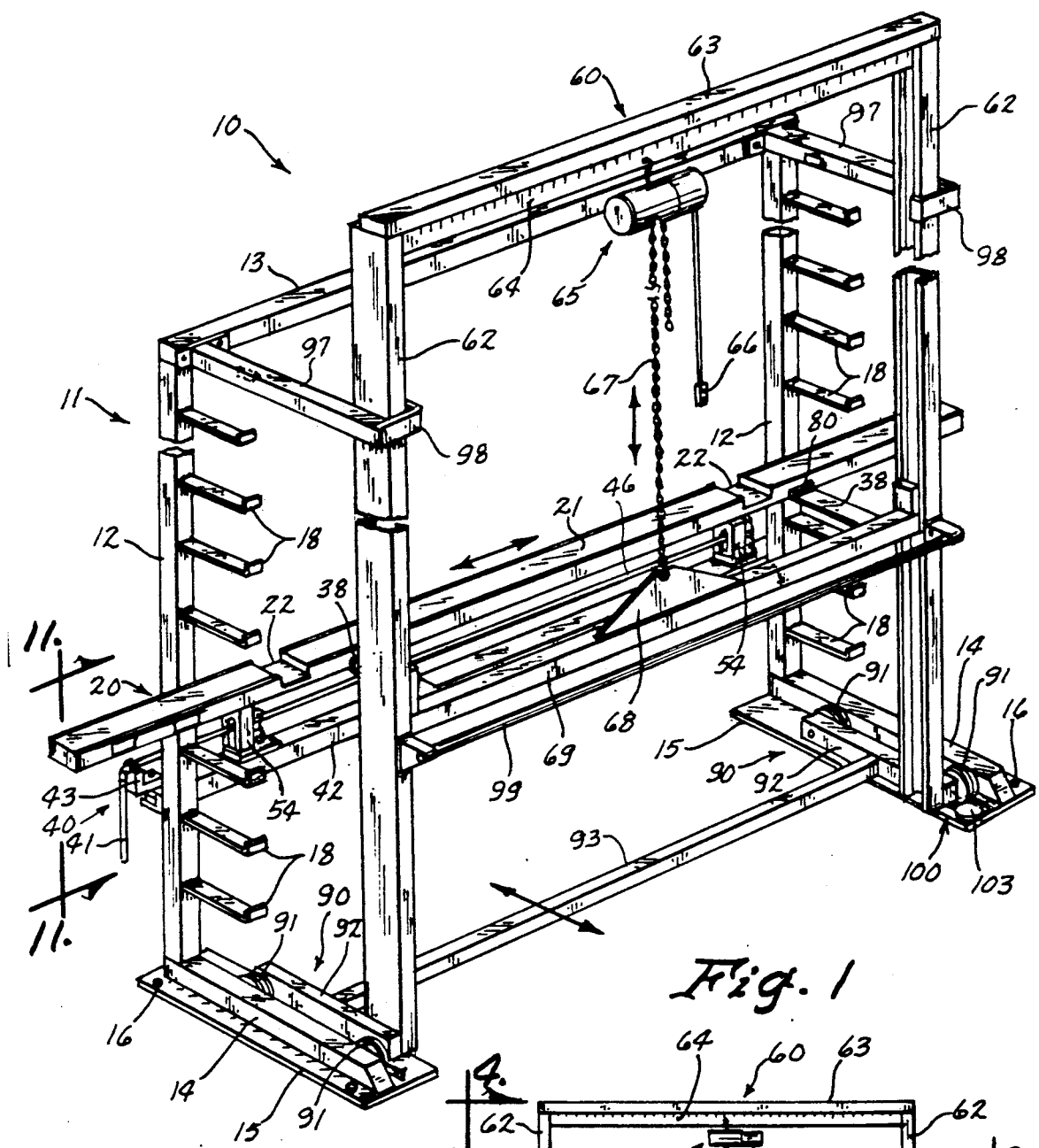
FIG. 1 shows a perspective view of a rack and die mover constructed in accordance with the present invention.

Referring now to the drawings wherein like reference numerals designate identical or corresponding parts throughout the several views, FIG. 1 shows a rack and die mover (10) constructed in accordance with the present invention. A die rack (11) includes a frame (12) and a horizontal brace (13) attached to the top of the frame (12). The frame (12) is rigidly attached to members (14) at the bottom thereof which are welded to a plate (15) which is bolted to the floor by bolts (16).

Storage arms (18) are welded to the upstanding frame members (12) for receiving and storing dies thereon as will be explained below. A lateral translating mechanism (20) includes a member (21) having a pair of slots (22) disposed therein for receiving lift arms (38) as will be explained below.

Referring to FIGS. 9 and 10 it is noted that the member (21) can be slid left or right on rollers (23) which are rotatably attached to a shaft (24) disposed in sleeve (25). The sleeve (25) is welded to an arm (26) by a flange (27).

The rollers (23) are disposed in tracks (28) which are encompassed by flanges (29) and (30). The flange (29) forms a part of member (21) and the flange (30) has a vertical portion (31) formed in one piece therewith. The member (31) has an opening (32) cut therein in two different locations as can best be seen in FIGS. 9 and 1.

Figure 2:
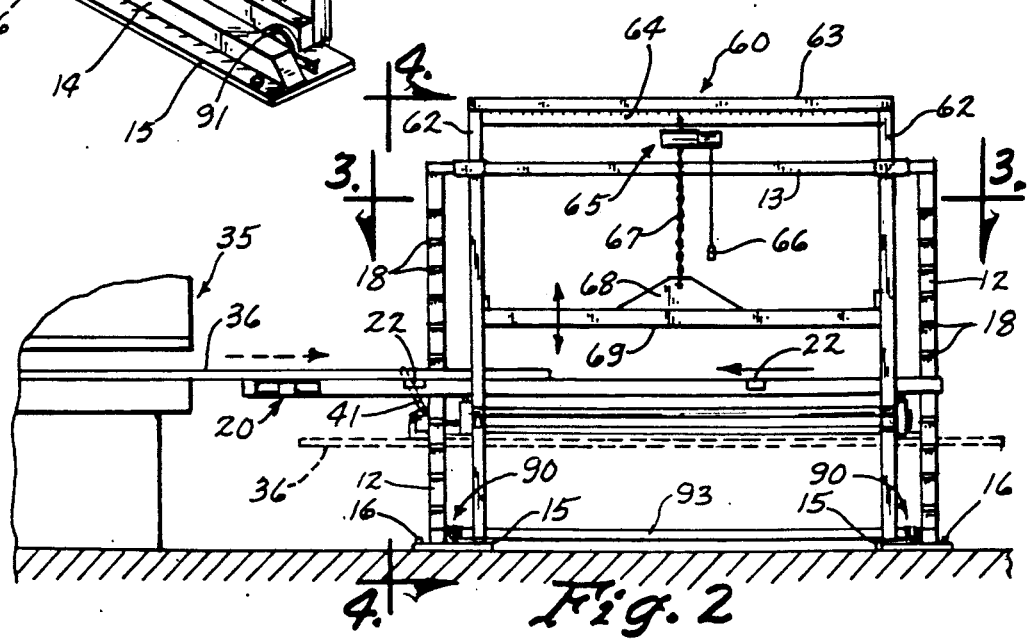
FIG. 2 is a front view of the preferred embodiment of the present invention shown removing a die from a pressbrake machine and storing it on the storage rack of the preferred embodiment.

The members (21), (31) and (28) are all rigidly interconnected so that they move as one piece left or right as is shown in FIGS. 1 and 2.

The pressbrake machine (35), shown in FIG. 2, is of a design that receives and holds elongated dies (36) at two different levels. Accordingly, the vertical lifting mechanism (40) shown in FIGS. 9, and 11-15 is utilized to selectively move a die (36) between the positions shown in FIGS. 12 and 15.

Referring to FIG. 1, it is noted that a handle (41) is provided and referring to FIGS. 12 and 15, is pivotally attached to a member (42) which is, in turn, rigidly attached to the upstanding frame (12). A member (43) is bolted to the member (42) and a clevis member (44) provided part of the pivotal connection between the arm (41) and the die frame (11) by a pin (45) which extends through one end of the arm (41) and through the clevis (44).

A rod (46) is pivotally attached to the lever (41) at portion (39) of the rod (46) and this rod (46) is rigidly attached by a sleeve (47) to arms (48). The arms (48) are pivotally attached to arms (49). The arms (49) are pivotally attached to flanges (50) which are welded to plates (51) which are, in turn, bolted to members (42) as is shown in FIGS. 12 and 15. The upper portion of the arms (48) are pivotally attached by a pin (52) to L-shaped member (26).

Vertical guide tubes (53) are held in place by support members (54) having slots (55) therein to allow the arm (46) to pass therethrough and be movable up and down. Each of the support locks (54) shown in FIG. 1 has essentially all of the structure therein shown in FIGS. 12 and 15 except that there is only one lever (41) provided to move the rod (46) between the two positions shown in FIGS. 12 and 15.

Referring again to FIGS. 1 and 4, it is noted that a lifting mechanism (60) includes an upstanding frame (62) and a horizontal brace (63) and (64). An electrically operated winch (65) is operable by an electronic control (66) with up and down buttons to pull the chain (67) either up or down. The chain (67) is attached to a flange (68) welded to a cross member (69).

This cross member (69) is mounted in lift arm (62) in the manner shown in FIGS. 7 and 8 including rollers (70) rotatably attached at four locations to a bracket (71) for reducing friction and for causing the bracket (71) to keep the orientation thereof with respect to the frame member (62) as is shown in FIG. 8. A link chain (73) is welded to one of the walls of the left frame member (62) as is shown in FIGS. 7 and 8 and a sprocket (74) is rotatably attached to the member (70) so that as the cross member (69) is pulled up or down by the winch (65), both sides of the arm (69) will go up and down in synchronization to keep the arm (69) in a horizontal configuration since both ends of the arm (69) will have essentially the same structure therein as is shown in FIGS. 7 and 8 except that it will be a mirror image of that shown in FIGS. 7 and 8.

The horizontal member (69) which is moved up and down by the hoist (65) has lift arms (38) welded thereto as is shown in FIGS. 1, 3, 4 and 8. These lift arms have outer flanges (80) and inner flanges (81) associated therewith for guiding the elongated dies (36).

The lower part of the lift frame is mounted on a trolley structure (90) having trolley wheels (91) thereon which are pivotally attached to the member (92) which is rigidly attached to the lift frame member (62) and to a brace member (93) which extends between the members (92). The rollers (91) are guided by flanges (94) which are welded to the plates (15) as is best seen in FIGS. 5 and 6. Rollers (91) have grooves (95) into which the guide flange (94) extends.

The frame (62) can move toward the rack frame (11) until the rollers (91) contact the stop (96) shown in FIG. 5. This will correspond to the position where the lift arms (38) extend under the rack storage arms (18) or in the slots (22) of the lateral translating mechanism (20). Stop arms (97) are rigidly attached to the cross brace (13) and have flanges (98) thereon which extend around and into the vertical lift frame member (62) as is shown in FIG. 1. This provides a stop for the lift frame (60) so that it cannot move rearwardly beyond the position shown in FIG. 1 and 4.

When the lift frame (60) moves to the position shown in FIGS. 1, 4 and 6. The locking mechanism (100) shown in FIG. 6 will pivot over the top of a stop (101) which is welded to plate (15). This automatic lock (100) includes a lever (102) having a foot engaging pad (103) welded to one end thereof and a stop engaging end (104) on the other end thereof. A central portion of the arm (102) is pivotally attached to the bottom of the frame member (62) by a hinge (106). A compression spring (107) is attached to the arm (102) and biases the arm (102) to the position shown in FIG. 6 so that the end (104) engages stop (101) to hold the lift frame (60) in the position shown in FIGS. 1 and 4.

When it is desired to move the frame (60) between the position shown in FIGS. 1 and 4 and a position where the lift arms (38) can extend under the rack storage arms (18), the pad (103) is pushed downwardly against the pressure of the spring (107) to allow the end (104) to clear the stop (101) which will allow the frame (60) to move toward the frame (11).

When the frame (60) is returned toward the position shown in FIG. 4, the stop (101) will engage the bottom of the arm (102) to pivot it upwardly so that the end (104) can pass over the top of the stop (101) and when it passes beyond the stop (101), the spring (107) will again bias the end (104) into the position shown in FIG. 6 against the stop (101).

In operation, a plurality of dies (36) shown in FIG. 2 would be stored on the pairs of storage arms (18) which are at the same level on the die rack frame (11). These dies (36) are not shown in FIG. 1 in the storage position because that would obscure the rack and die mover (10) for illustration purposes.

When it is desired to move a die (36) from the pressbrake machine (35) shown in FIG. 2, the lever (41) would be actuated to either the position shown in FIG. 12 to the position shown in FIG. 15 depending upon the height of the die presently in the pressbrake machine (35). Then the lateral translating mechanism (20) is slid over from the position shown in FIG. 1 to the position shown in FIG. 2 where it is in close proximity to the pressbrake machine (35). Then the elongated die (36) is manually grasped and pulled over so that it can be slid onto the lateral translating mechanism as is shown in FIG. 2. After that is accomplished, the reader is asked to visualize that a die (36) is on top of the lateral translating mechanism (20) and member (21) as is shown in FIG. 1. At that time, the switch (66) is actuated to get the lift arms (38) at precisely the level of slots (22) in member (21) so that the arms (38) can slide under the die (36) which would be on top of the member (21). Then the foot pedal (103) is released and the arms (38) slid under the die (36) and into the slots (22) by grasping the handle (99) and pushing the lift frame (60) into that position.

Once the arms are under the die (36) in the slots (22), the lift mechanism (66) is actuated to lift the arms (38) and horizontal member (69) slightly, then the lift frame (20) can be pulled back to the position shown in FIGS. 1 and 4 or at least until the die (36) which is on the arms (38) can be raised or lowered to the proper or desired storage position thereof. Once the die (36) and arms (38) has been moved up or down to the storage position, then the brake (103) can again be released, the frame (60) pushed in toward the arms (18) and the actuating mechanism (66) can be utilized to lower the arms (38) and die (36) so it can come to rest on one of the pairs of storage arms (18) on the storage rack (11).

This process can of course be reversed at any time by positioning the arms (38) under any one of the dies on the storage arms (18), raising the arms (38) until they support a die (36), pulling the frame (60) outwardly to the position shown in FIGS. 1 and 4, lowering the arms (38) and die (36) to a position wherein the arms (38) can be pushed into slots (22) thereby resting the die on member (21), lowering the arms (38) so they do not support the die (36) and then pulling the frame (60) back to the position shown in FIGS. 1 and 4. If the lateral translating device (20) is not at the proper vertical level, it can be adjusted by using the lever (41), and once at the proper vertical level, then the die (36) and lateral translating mechanism (20) can be moved to the position shown in FIG. 2, whereupon the die (36) can be moved onto the pressbrake machine (35) in the direction of the solid arrow in FIG. 2.

This loading or unloading of the dies (36) onto or off from the pressbrake machine (35) can be done at any level which will be achievable by the vertical lift (40) and lever (41). It will of course be understood that such a vertical lifting or lowering mechanism can be of other configurations and can lift or lower to other degrees than are shown in the preferred embodiment shown herein. Also, more or less of the storage arms (18) can be attached to the upstanding frame member (12) and these frame members (12) can be taller or shorter depending upon the circumstances encountered.

Accordingly, it will be appreciated that the preferred embodiment shown herein does indeed accomplish the aforementioned objects. Obviously many modifications and variations of the present invention are possible in light of the above teachings. It is therefore to be understood that, within the scope of the appended claims, the invention may be practiced otherwise than as specifically described.

I claim:

1. A rack and die mover comprising:

a die rack including a generally inverted U-shaped die rack frame having foot members disposed on the lower portion of the die rack frame wherein the foot members are secured to mounting plates wherein the upper portion of the die rack frame is provided with outwardly extending stop arms which are equipped with flanges on their outboard end;

storage means attached to said frame for holding a plurality of elongated dies in a substantially horizontal orientation;

lateral translating means attached to said frame for moving dies thereon to one side of said frame, said lateral translating means being movable between a first position substantially adjacent to said storage means and a second position wherein a large portion of said lateral translating means is to one side of said frame whereby a die disposed thereon can easily be transferred to or from a machine on which it is used; and lift means operably attached to said frame for moving dies between positions on the storage means and a position on top of said lateral translating means when said lateral translating means is in said first position thereof; wherein, said left means comprises:

a generally inverted U-shaped lift frame whose upper portion is disposed within the said stop arms and flanges of said die rack frame and whose lower portion is further provided with trolley means mounted on guide flanges which are operatively disposed within the foot members and attached to the mounting plates of said die rack frame; arm means attached to said lift frame for selectively extending under said elongated dies; means attached to said lift frame and to said arm means for selectively raising or lowering said arm means; wherein, the trolley means are provided on said left means for selectively moving said lift frame between a first position wherein said arm means is disposed in the same vertical plane as portions of said storage means and said lateral translating means and a second position wherein said arm means can move up or down without contact with said lateral translating means or without contact with dies on said storage means.

2. The rack and die mover of claim 1 further comprising:

means attached to said frame for selectively adjusting the vertical position of said lateral translating means with respect to said frame whereby it can be used to transfer a die to or from a machine at more than one vertical level.

3. The rack and die mover of claim 2 including means for locking said lift frame in said second position thereof.

4. The rack and die mover of claim 3 including means for releasing said locking means to permit said lift frame to move from the second to the first position thereof.

5. The rack and die mover of claim 1 including at least one recess in the top of said lateral translating means for receiving a portion of said lift means.

* * * * *

UNITED STATES PATENT AND TRADEMARK OFFICE
CERTIFICATE OF CORRECTION

PATENT NO. : 5,051,051

DATED : September 24, 1991

INVENTOR(S) : Dale L. Grabill

It is certified that error appears in the above-identified patent and that said Letters Patent is hereby corrected as shown below:

Column 6, line 25, "left" should be --lift--.

Column 6, line 38, "left" should be --lift--.

Signed and Sealed this

Fifth Day of January, 1993

Attest:

DOUGLAS B. COMER

Attesting Officer

Acting Commissioner of Patents and Trademarks